United States Patent [19]

Levenez

[11] Patent Number: 4,716,934

[45] Date of Patent: Jan. 5, 1988

[54] CONNECTORS USED IN FLUID TECHNIQUES

[75] Inventor: Yves Levenez, Vause le Penil, France

[73] Assignee: Legris, Rennes, France

[21] Appl. No.: 851,612

[22] Filed: Apr. 14, 1986

[51] Int. Cl.$^4$ ............................................. F16K 11/06
[52] U.S. Cl. ................................. 137/625.21; 137/589; 251/149.8
[58] Field of Search ................... 137/625.21, 302, 589; 251/149.8

[56] References Cited

U.S. PATENT DOCUMENTS

| | | | |
|---|---|---|---|
| 195,937 | 10/1877 | Lutz | 137/625.21 X |
| 856,652 | 6/1907 | Murphy | 137/625.21 |
| 880,580 | 3/1908 | Seagrave | 137/625.21 X |
| 2,311,708 | 2/1943 | Sundholm | 251/149.8 |
| 3,707,991 | 1/1973 | Shapiro | 137/625.21 X |

FOREIGN PATENT DOCUMENTS 181735 2/1906 Fed. Rep. of Germany ........................ 137/625.21

Primary Examiner—Robert G. Nilson
Attorney, Agent, or Firm—Sughrue, Mion, Zinn, Macpeak and Seas

[57] ABSTRACT

Rotary switching connectors providing both connection of the pipes with each other or to fixed members and for establishing the flow of fluid from the ones to the others or interrupting said flow by closing off the upstream circuits and venting the downstream circuits to the atmosphere. They are formed of two coupled elements 1 and 2 able to be manually rotated with respect to each other about an axis XX and to keep the position which is given them. An inlet channel 4 in element 2 and an outlet channel 3 in element 1 each equipped with an integrated connector 66 and 55 open into their respective adjacent faces over the same circle of radius XY. The angular registration of these orifices allows the sealed bidirectional passage of the fluid of the device by means of a seal 8 housed in a cup 7 at the periphery of channel 4 and compressed between the two elements 1 and 2. In any other rotary indexing position, channel 4 is closed by the sealing application of seal 8 to the smooth face II of element 1 and the outlet channel 3 which comprises no seal is in connection with the atmosphere through a bore 9. The rotary switching connector may comprise a plurality of inlets and outlets providing different passage combinations.

6 Claims, 23 Drawing Figures

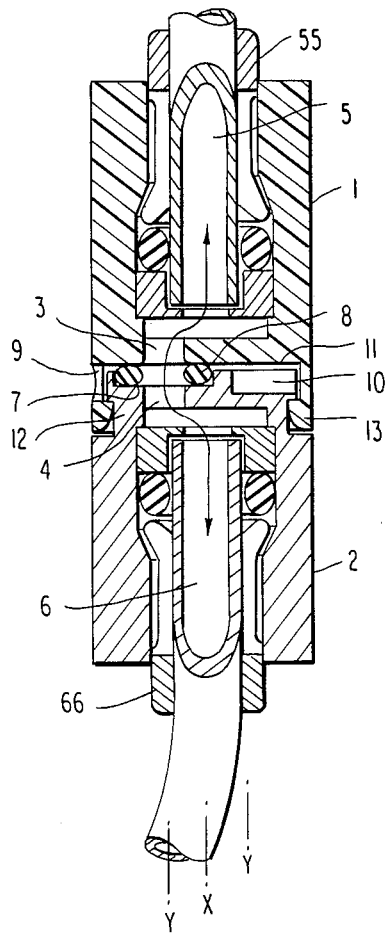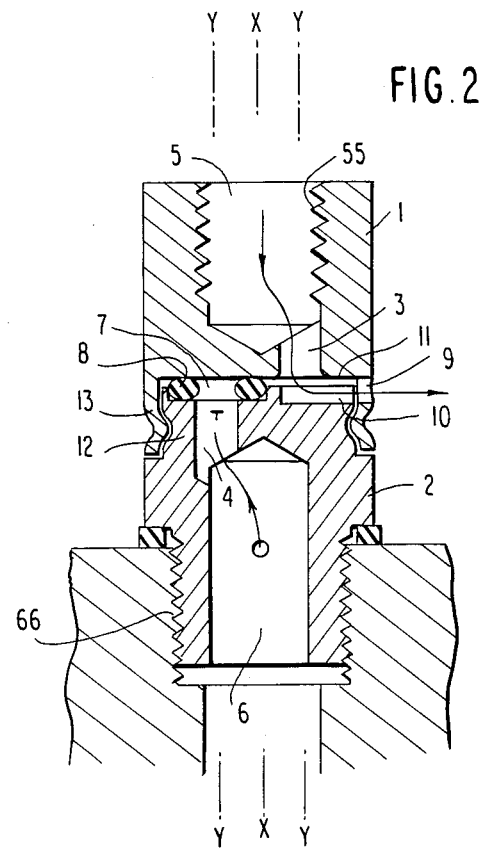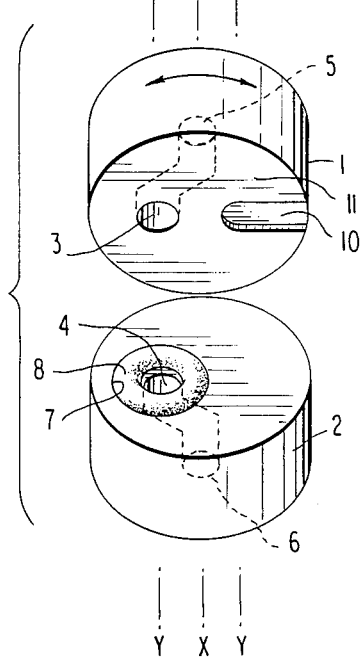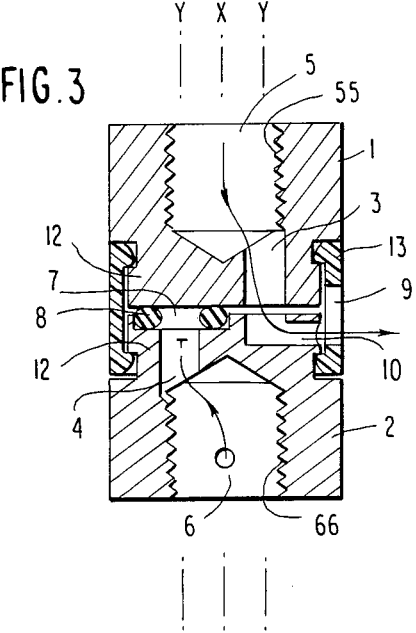

CONNECTORS USED IN FLUID TECHNIQUES

BACKGROUND OF THE INVENTION

The connectors used in fluid techniques and more particularly in pneumatic techniques only allow the pipes to be disconnected to the extent that they have been previously emptied of their pressure. The connecting element of the "coupler" type allows such disconnection more readily under pressure, through an incorporated valve which automatically closes the upstream fluid flow by the effect of its pressure; the need to equip the downstream pipe with an appropriate end piece and the fact that being uncoupled it is then free of any fixing means limits the use of couplers to pipes having a mobile character. In fixed and complex installations, valves are preferred to which the pipes are permanently connected, allowing the circuit of the fluid to be established or interrupted and in this latter case by decompressing the downstream pipe. These valves of the bistable type, with mono or multifunctions, with manual controls by actuating a lever or rotating a knob, are very much used in the pneumatic technique for controlling and routing information signals. Because of their complexity, they prove to be very expensive not only at the time of buying but also for maintenance, compared with their low frequency of use.

The aim of the present invention is to offer a device of robust simple construction covering these needs and which may be installed on the pipe the connection of which it provides at the same time either to another pipe or to the orifice of a fixed component. Depending on its function, it may ensure the continuity of one or more fluid flows, or interruption thereof with emptying of the downstream circuits, or different combinations of the upstream circuits with respect to the downstream circuits.

SUMMARY OF THE INVENTION

A rotary switching connector of the invention is formed essentially of two elements firmly coupled together so that they may be driven in rotation manually with respect to each other and keep their relative positions which are thus given time.

Each constituent element comprises, for the passage of the fluid, one or more channels whose orifices, opening into their faces adjacent the junction, are situated on a circle of the same diameter having as center the axis of rotation of the elements.

In at least one element these orifices are capped with a resilient seal, more especially an O-seal made from rubber, embedded in a cup shaped housing slightly shallower than the thickness of a seal and holding it laterally in position. On coupling of the two elements together, this seal is slightly compressed on the face adjacent the opposite element so as to provide sealing with respect to the atmosphere of the channel to which it is applied in all the rotary indexing positions and during the rotation causing it to slide over this face. Thus the orifice of a channel of one element may be brought into axial concidence with the orifice of a channel of the other and the bidirectional passage of the fluid may be provided sealingly on each side of the switching connector. In a different position, the channel equipped with an O-seal, considered to be an input channel connectable to an upstream circuit will be closed by the smooth face of the opposite element, whereas the channel of this element not equipped with the seal and considered in this case to be an output channel connectable to a downstream circuit, will be in connection with the atmosphere through an open channel external to the device. The external orifices of the different channels are provided either with male or female threads, or with so called instantaneous integrated connectors. The pipes used in the case of a plurality of orifices in each of the elements of the switching connector are then of the semi rigid type withstanding a certain torsional stress and path deflection.

The following description of several embodiments made with reference to the accompanying drawings, will better show the operation, it being understood that these embodiments are given solely by way of indication and are in no wise limitative.

BRIEF DESCRIPTION OF THE DRAWINGS

FIG. 1 is an axial sectional view of a rotary switching connector forming one embodiment of the present invention.

FIG. 2 is an axial sectional view of a rotary switching connector of the two-way type forming a further embodiment of the invention.

FIG. 3 is an axial sectional view of another switching connector of the two-way type forming a further embodiment of the invention.

FIG. 4 is an isometric projection showing schematically the geometrical positions of the channels of a switching connector of the two-way type such as shown in FIGS. 1, 2 and 3.

FIG. 5b is a lateral plan view of the switching connector shown in FIG. 5a.

DESCRIPTION OF PREFERRED EMBODIMENTS

Figure 5A:
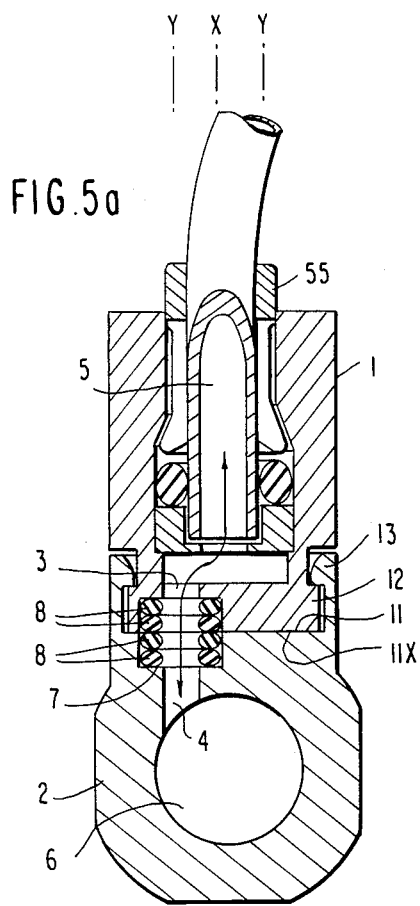
FIG. 5a is an axial sectional view of a switching connector of the reversible two-way type in the form of a banjo.

FIG. 1 is a view in axial section of a rotary switching connector of the invention, of the two way type, for connecting an upstream pipe at its inlet to a downstream pipe at its outlet, and providing at will either the bidirectional continuity of the fluid flow, or sealing interruption thereof and venting to the atmosphere of the downstream pipe, this latter then being able to be uncoupled very easily. This switching connector is formed of a plastic material part 1 comprising a female circular skirt 13 force fitted over the male circular end piece 12 of part 2 made from metal or from a plastic material. The female skirt 13 comprises one or more annular reliefs with a hook shaped profile, cooperating with one or more grooves in the male end piece 12 for, after snap-fitting of part 1 on part 2, preventing any dislocation thereof while still allowing them to rotate with respect to each other about the common axis XX. The friction due to this type of assembly allow the parts to keep the position which is given them by a muscular rotational force. In part 1, a channel 3 is in communication with an external orifice 5, in part 2 a channel 4 is in communication with an external orifice 6. Each orifice being equipped with cartridges 55 and 66 called instantaneous pipe coupling cartridges. The internal orifices of channels 3 and 4 open into the adjacent junction faces of the two parts over the same circle of diameter YY having as center the axis of rotation XX. The internal orifice of channel 4 is capped with a circular cup 7 containing a rubber O-seal 8. Cup 7 is slightly shallower than the thickness of seal 8, which is compressed on the smooth face 11 of part 1 by the negative assembly play. In the position shown in FIG. 1, the axes of orifices 3 and 4 coincide, allowing the sealing bidirectional flow of fluid from orifice 6 to orifice 5. In the position of part I removed angularly by 180° with respect to the position shown, channel 3 would be brought into coincidence with a groove or radial channel 10 in part 2, this groove 10 then being in extension of a bore 9 formed in a wall of skirt 13 on the radius of channel 3. Orifice 5 would then be in communication with the atmosphere and orifice 6 would be sealingly closed by seal 8 bearing on the smooth face 11 of part 1. Channel 6-4 equipped with a seal 8 is considered to be the channel for intake of the fluid and channel 5-3 adapted for being vented to the atmosphere, to be the outlet channel.

FIG. 2 is an axial sectional view of another rotary switching connector of the two way type, shown in the position providing closing off of its inlet 6 and venting of its outlet 5. Orifice 5 comprises a female thread 55 for screwing a separate connector and orifice 6 a male thread 66 allowing the device to be screwed to the orifice of a fixed apparatus; the control of rotation being provided exclusively by part 1. The female circular skirt 13 of part I is crimped to the male end piece of part 2 containing the inlet channel 6-4 and consequently seal 8. In an embodiment the reverse of the one shown and in which the inlet orifice is orifice 5, the O-seal 8 would be contained in a cup 7 of part 1 and would cap the channel 3.

FIG. 3 is an axial sectional view of another switching connector of the two way type, shown in the position for emptying the pipe connected to its orifice 5. The two parts I and 3 are here coupled together by means of a plastic material ring 13 comprising internal circular reliefs in the shape of a hook cooperating with circular grooves formed in the identical male end pieces 12 of each of parts I and 2 so as to oppose separation thereof. A series of bores 9 formed at the periphery of ring 13 allows the outlet channel 5-3 to be vented to the atmosphere in all the angular positions other than the one providing the bidirectional sealed flow of fluid characterized by the axial coincidence of channels 3 and 4. Orifice 5 and 6 comprise female threads 55 and 66 intended to receive conventional coupling elements.

FIG. 4 is an isometric protection showing schematically the geometrical positions of the channels of a switching connector of the two way type, such as shown in FIGS. 1, 2 and 3.

Figure 5B:
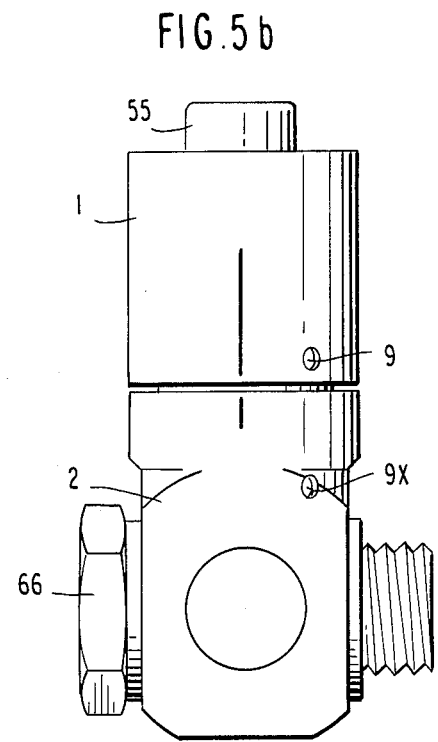
Figure 6A:
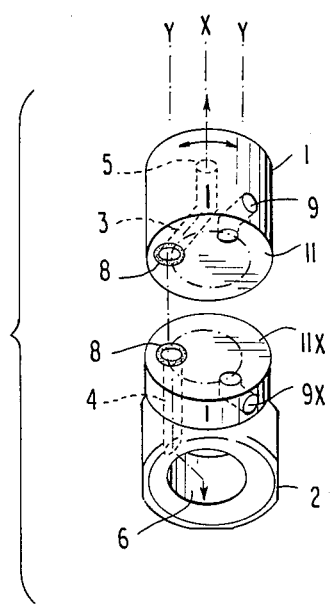
FIGS. 6a, 6b and 6c are three isometric projection views of various indexing positions of the apparatus of FIGS. 5a and 5b.
Figure 6B:
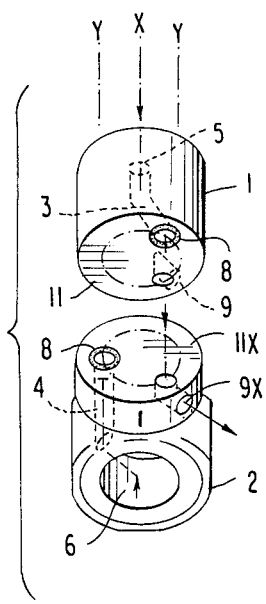
Figure 6C:
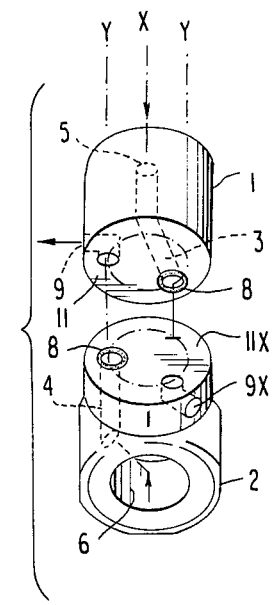

FIG. 5a is an axial sectional view of a switching connector of the reversible two way type in the form of a banjo and FIG. 5b, its lateral plan view;

FIGS. 1, 6a, 6b, 6c show in three isometric projections views the three useful indexing positions of this apparatus. The apparatus shown in FIG. 5a, 5b and 6a, 6b, 6c is characterized by the fact that its orifices 5 and 6 may serve either as inlet or as outlet, and that the assignment of an orifice to the outlet connection only depends on the direction of the 120° rotation with respect to the passage position, which allows venting to the atmosphere. For this, channels 3 and 4 each comprise a set of two seals 8 superimposed in cups 7 so as to offer a greater compression resilience. In the bidirectional passage position such as shown in FIG. 5 and the left hand view of FIG. 6, each set of seals 8 is applied one on the other. In a different position from that at 120° in the clockwise direction, as shown in the central view in FIG. 6, channel 3 is being vented by its correspondance with the channel 9 in part 2; conversely, in the right hand view of FIG. 6, a rotation of 120° in the anticlockwise direction has brought a venting channel 9 in part I in correspondance with channel 4. In all the other positions the channels 3 and 4 are closed.

Such a switching connector as shown in FIGS. 5a, 5b and 6a, 6b, 6c may thus be mounted either on a pressurized fluid emitting or receiving apparatus.

The process of the invention allows more complex functions to be fulfilled and more particularly the construction of apparatus which, since they comprise a plurality of inlets and outlets, are of the multichannel type and offer a great choice of inlet-outlet passage combinations.

FIGS. 7 to 15 are schematic views, in isometric projection, of a number of these switching connectors described by way of non limitative example.

Figure 7:
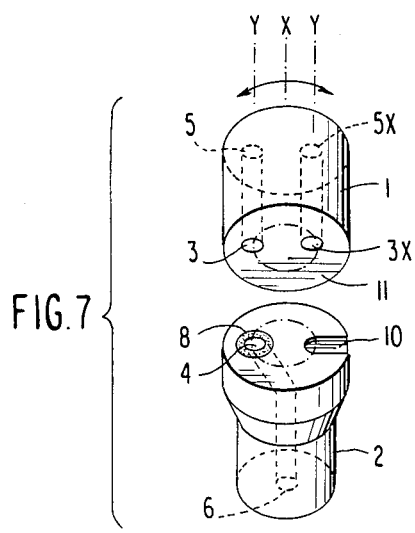
FIGS. 7 through 15 inclusive are schematic views and isometric projection of a number of switching connectors.

FIG. 7 shows schematically a switching connector of the four way type with one inlet 6 and two outlets 5 and 5X. The outlets 5 and 5X open into the junction phase II of parts I and 2 through orifices, respectively 3 and 3X, occupying on the circle of radius XY diametrically opposite positions. In part 2, the single inlet 6 opens into the junction face through a channel 4 equipped with an O-seal 8; it is directly opposite a radial channel 10 venting to the atmosphere. In the respective positions of parts 1 and 2, such as shown, the bidirectional passage of the fluid is established from the inlet 6 to the outlet 5, whereas outlet 5X is in communication with the atmosphere through groove 10 and bore 9 not shown in the skirt 13 of part I. A rotational of 180° of part 2 establishes the reverse connections.

Figure 8:
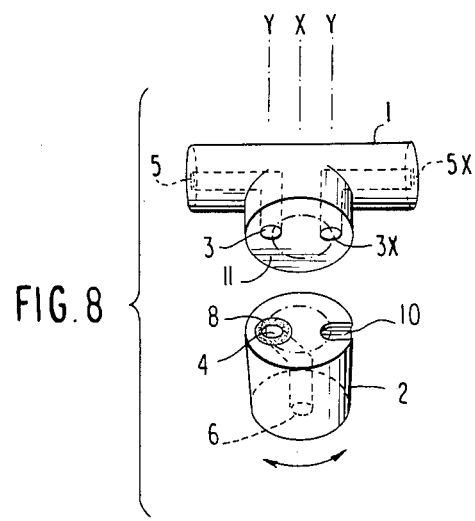

FIG. 8 shows a switching connector having identical functions to that shown in FIG. 7, but whose outlets 5 and 5X extend perpendicularly to the rotational axis XX.

Figure 9:
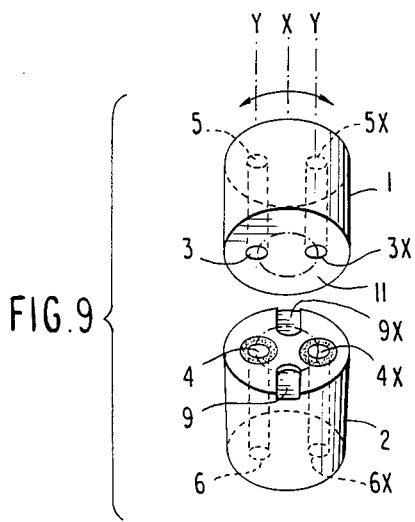

FIG. 9 shows a switching connector of the four way type with two inlets and two outlets for conveying two separate fluid flows through connections 6-5 and 6X-5X, such as shown, or, in the position rotated by 180°, through connections 6-5X and 6X-5. In a different 90° position, outlets 5 and 5X are in communication with the atmosphere through two radial grooves 9 and 9X disposed diametrically oppositely on the circle of radius XY and in quadrature with the inlet channels 4 and 4X.

Figure 10:
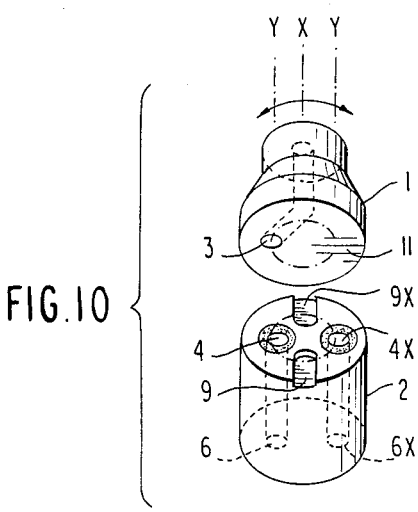

FIG. 10 shows a switching connector of the four way type having two inlets 6 and 6X and a single outlet 5, for directing one or other of two incoming pressure informations to a single downstream circuit.

Figure 11:
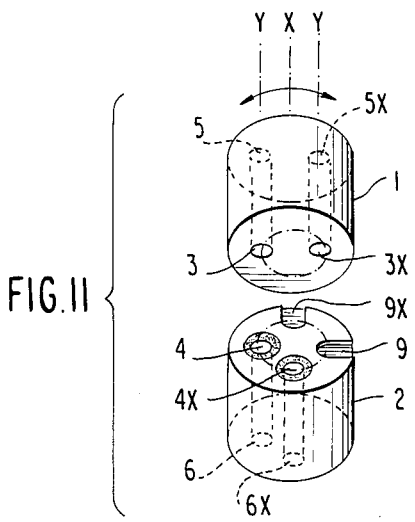

FIG. 11 shows a switching connector with two inlets 6 and 6X and two outlets 5 and 5X. Orifices 4 and 4X corresponding to the inlet 6 and 6X in part 2 occupy on the circle of radius XY positions angularly spaced by 90°, whereas orifices 3 and 3X corresponding to the outlets 5 and 5X in part I occupy diametrically opposite positions on this same circle. Depending on the initial relative position of parts I and 2, such as shown, the passage connection from inlet 6 to outlet 5 is established, outlet 5X to the atmosphere through the radial groove 9 and inlet 6X is closed. By a clockwise rotation of 90°, the connection 6X-5 is obtained as well as venting of the outlet 5; by an anticlockwise rotation of 90° the connection 6X-5 is obtained with venting of the outlet 5X; finally, by a rotation of 190° with respect to the initial position, the reverse connections 6-5X 6X-5 are established.

Figure 12:
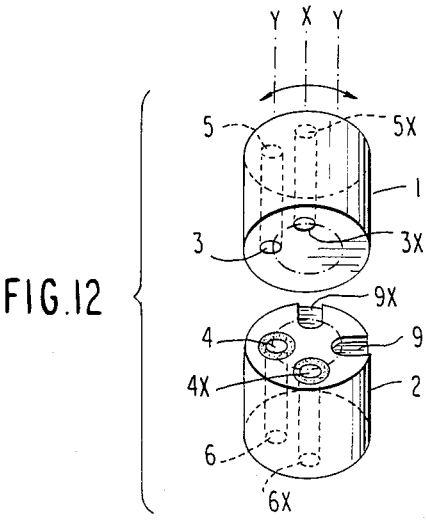

In FIG. 12 showing another switching connector, the orifices 4 and 4X corresponding to inlets 6 and 6X as well as orifices 3 and 3X corresponding to outlets 5 and 5X are staggered by 90° over the circle of radius XY. In the four indexing positions distant from each other by 90°, it is possible to obtain successively in the initial position such as shown, the connections 6-5 and 6X-5X; in a second position the connections 6X 5, 6 closed and 5X to the atmosphere in a third position, the inlets are closed and the outlets to the atmosphere; in a fourth position, the connections 6-5X are obtained, 6X is closed and 5 to the atmosphere.

Figure 13:
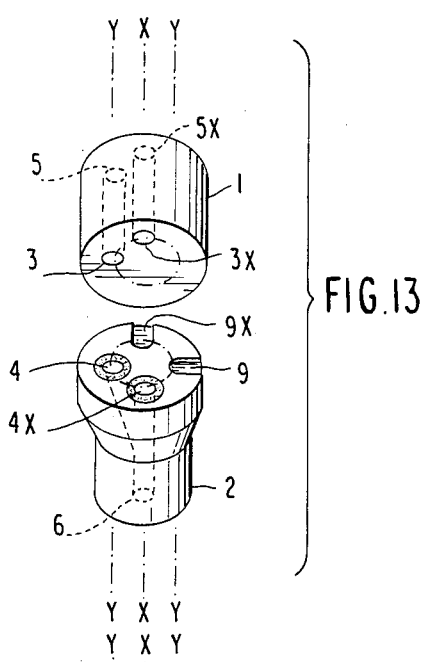

FIG. 13 is the schematic representation of the switching connector described above with reference to FIG. 12 but in which the two channels 4 and 4X are connected to a single inlet 6, which allows this apparatus either to establish the connection 6 to 5 and 5X, or to establish the connection 6-5 or 6-5X, or else, with the inlet 6 closed, to establish 5 and 5X to the atmosphere.

Figure 14:
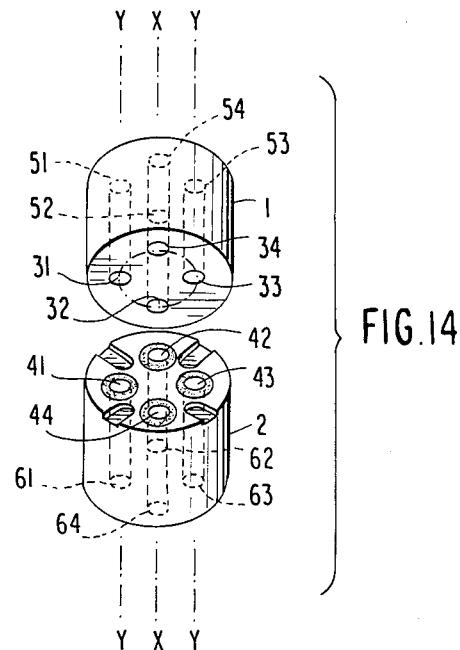

FIG. 14 is the schematic representation of a multiway switching connector with four inlets and four outlets, for providing four programs and four different inlet outlet connections for each indexing by a 90° rotation with respect to the initial position, such as shown, as well as four positions for emptying all the outlets at each 45° position.

In all the switching connectors described above with reference to FIGS. 1 to 14, each part I and 2 comprises pipe connection orifices. The invention allows these orifices to be situated in in a single one of these two parts, which may then be mobilized; the other part containing only transfer channels and serving as rotary control.

One of the advantages of the rotary switching connectors of the present invention is that of offering the user immediate knowledge of the circuits formed, of the circuits closed and of the circuits being vented, by direct vision of the correspondence of marks carried by each of parts 1 and 2.

FIGS. 17a, 17b, 17c and 17d show four top views of a switching connector in accordance with the description made with reference with FIG. 1. The two views at the top, diametrically opposite, show that the continuity of the connection between the inlet and the outlet is established, the symbolic circle engraved on part 2 showing the inlet orifice of this apparatus. The two bottom views show, after indexing rotation, that the inlet orifice is closed: the symbol of an upturned T being the representation of it and that the outlet orifice is in connection with the atmosphere by the engraved V which is the pneumatic symbol thereof.

Figure 15:
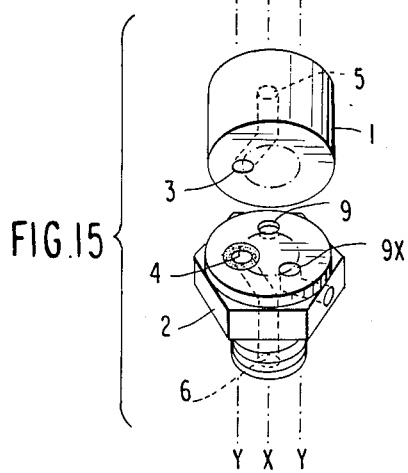
Figure 17A:
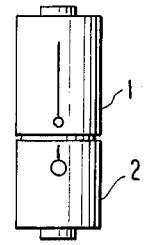
FIGS. 17a, 17b, 17c and 17d are four top views of a switching connector in accordance with FIG. 1.
Figure 17B:
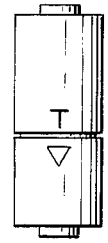
Figure 16:
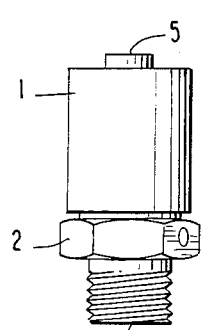
FIG. 16 is a schematic isometric projection of a switching connector forming yet another embodiment of the present invention.
Figure 17C:
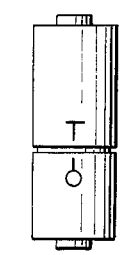
Figure 17D:
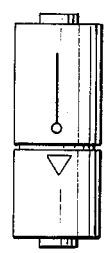

FIGS. 15 and 16 shows isometric projection of a switching connector intended to be screwed by the hexagonal nut of part 2 on a fixed member; it is then impossible to foresee after screwing which the faces of this part 2 would be which are visible for engraving symbols thereon. To overcome this difficulty, the inlet channel 4 as well as two venting channels 9 and 9X open in the circle of radius XY spaced apart by an angular distance of 120°, the apparatus thus comprising a passage position and two venting positions. FIGS. 17a; 17 baretop views of the switching connector showing the marks which are engraved thereon. Parts 1 and 2 carry along their generatrices three groups of linear marks, each group comprising a different number of lines and spaced from the other by 120°. The registration of a single marking group visible on the control part 1 and its counterpart on the fixed part 2 comprising the same number of lines, indicates that the connection 6-5 is established. On the other hand, the registration of marks with a different number of lines closes inlet 6 and communicates the outlet 5 with the atmosphere.

What is claimed is:

1. A rotary switching connector for conveying a gaseous fluid to an installation and venting thereof, characterized in that it comprises two elements, one an outlet element (1), the other an inlet element (2) coupling means for assembling said elements coaxially so as to be able to rotate with respect to each other through a muscular force about a common rotational axis (X); and wherein each external orifice of at least one set of elements is equipped with a connector (66) allowing axial rotation of said connector 66 without torsional stress of the pipe which extends therefrom; the external orifices (5, 6) of each element (1, 2) open in their adjacent faces through bores (3, 4) offcentered by the same radial value (X-Y) with respect to the common rotational axis (X) of the elements; the bores (4) opening into the junction face of the inlet element (2) are capped by a resilient material O-seal embedded in a cup (7) shallower than the thickness of said seal which seal is slightly crushed against the adjacent smooth face (II) of the outlet element (I) during assembly; and wherein in one angular position of one element with respect to the other, at least one inlet orifice (6) is in sealed communication, through the seal (8), with an outlet orifice (5) and that in a different position in which said inlet orifice (6) is closed by the application of its seal (8) to a zone without bore of the smooth face (II) of the outlet element (1), said outlet orifice (5), is in communication with the atmoshere through the space created by the play existing between the adjacent faces of the two elements outside the surface occupied by the O-seal(s) (8) and wherein said coupling means comprises a female skirt of one element enveloping a male end of said other element, and one of said skirt and said male end having a hooked shaped profile snap engaging a facing groove within the other of said skirt and male end.

2. The rotary switching connector according to claim 1 wherein the means allowing the axial rotation without torsional force of the pipe to be connected comprises a cartridge (55, 56) of the instantaneous connection type, integrated with said pipe.

3. The rotary switching connection according to claim 1, wherein said means for assembling said two elements (1) and (2) for rotation about a common rotational axis (X), comprises a snap fitting female cylindrical skirt (13) of a plastic material of one element over a metal male end piece of the other element, said male end piece (12) comprising a circular projection with a hook shaped profile of an external diameter greater than the internal diameter of the female skirt (13); said hook shaped profile being positioned in a groove within said skirt.

4. The rotary switching connector according to claim 1, wherein said means for assembling said two elements (1 and 2) for rotation about a common rotational axis (X) comprises a peripheral crimp of a metal cylindrical skirt (13) of one element within a groove of a male end piece of the other element.

5. The rotary switching connector according to claim 1, wherein said elements are formed of rigid material and said means for assembling said two elements (1 and 2) for rotation about a common rotational axis, comprises a plastic material ring (13) receiving the cylindrical male end pieces of said two rigid material elements and said ring comprises circular projections with a hook shaped profile at both ends received within annular grooves within respective cylindrical male end pieces.

6. The rotary switching connector according to claim 1, wherein each element (1 and 2) comprise etch marks and graphic symbols for indicating, by registration thereof through rotation, the inlet-outlet connections established, the outlets for venting to the atmosphere and the closed inlets.

* * * * *